June 23, 1931.  F. A. VAN BEZEL  1,811,737
PISTON AND ROD CONNECTION
Filed July 11, 1930

Frank A. Van Bezel
INVENTOR
BY Victor J. Evans
ATTORNEY

Patented June 23, 1931

1,811,737

UNITED STATES PATENT OFFICE

FRANK A. VAN BEZEL, OF EL CENTRO, CALIFORNIA, ASSIGNOR TO DUAL AIRCRAFT MOTORS INC., LTD., OF EL CENTRO, CALIFORNIA

PISTON AND ROD CONNECTION

Application filed July 11, 1930. Serial No. 467,367.

This invention relates to pistons and has particular relation to means for removably securing a piston upon the end of its rod.

An object of the present invention is to provide means for rigidly and securely connecting a piston and rod, whereby the same will be held against relative movement, the connecting means being such that the heat of an internal combustion engine will not interfere with the separation of the piston and rod when occasion for such separation arises.

Another object of the invention is the provision of means of the above character which are simple in construction, may be readily manipulated, and will positively prevent relative rotary movement between the piston and its rod.

With the above and other objects in view, the invention further includes the following novel features and details of construction, to be hereinafter more fully described, illustrated in the accompanying drawings and pointed out in the appended claims.

In the drawings:—

Figure 1:
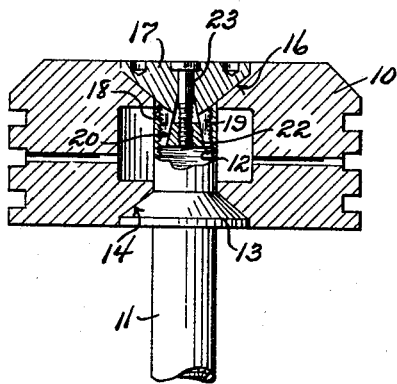
Figure 1 is a sectional view of a piston with the invention applied, a portion of the rod and its attaching means being shown in section.
Figure 2:
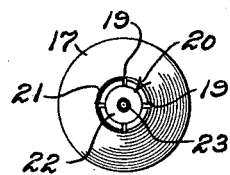
Figure 2 is a bottom plan view of the plug.
Figure 3:
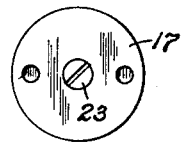
Figure 3 is a top view.
Figure 4:
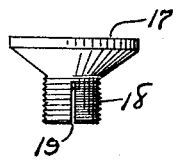
Figure 4 is a side view.

Referring to the drawings in detail wherein like characters of reference denote corresponding parts, the reference character 10 indicates a piston which may be of any suitable construction, the piston shown being of the type used in an internal combustion engine which forms the subject matter of a separate application filed by me of even date.

This piston is mounted upon the end of a rod 11, and the latter is designed to move axially within a rotary sleeve mounted in the cylinder of the engine. All of the foregoing constitutes the subject matter of a separate application.

In an engine constructed in the manner just referred to, there is a tendency of the piston to rotate, due to the rotation of the sleeve. This rotation of the piston tends to cause the same to become loose upon the end of the rod 11, and it is the purpose of the present invention to connect the piston and rod in such manner that relative rotation between the piston and its rod will be positively prevented. At the same time, it is the purpose of the invention to permit of the disassociation of the piston and rod, when desired.

The rod 11 is hollow at one end and is interiorly threaded as shown at 12, while adjacent this end of the rod there is provided a beveled collar 13. This collar is rigid with the rod and is adapted to engage a beveled seat 14 provided at one end of an opening which extends through the piston. At the opposite end of this opening there is provided a beveled seat 16 which is adapted to be engaged by a beveled plug 17. The plug 17 carries a stem 18 and this stem is longitudinally split as shown at 19. In addition, the stem is provided with a flared bore 20 so that the portions of the stem between the slits 19 define fingers 21 which are exteriorly threaded.

By inserting the hollow end of the rod 11 within the piston and threadedly engaging the stem 18 therewith, the piston and rod will be automatically adjusted to their proper relative positions and the rod will be properly centered within the piston.

In order to hold the piston and rod against relative rotary movement, the invention provides a tapered spreader 22. This spreader is positioned within the socket of the stem 18 and engages the beveled wall of the socket. A screw 23 extends inward through the plug 17 and threadedly engages the spreader 22 so that the latter may be moved axially to force the fingers 21 outward and force the threads upon these fingers into binding engagement with the threads 12 of the stem. This engagement will act to positively prevent relative rotary movement between the piston and its rod, yet will permit of the separation of the piston and rod when desired.

The invention is susceptible of various changes in its form, proportions and minor details of construction and the right is herein reserved to make such changes as properly fall within the scope of the appended claims.

Having described the invention what is claimed is:—

1. In combination, a piston having an opening therethrough and beveled seats at each end of the opening, a rod having a hollow interiorly threaded end within said opening, a beveled collar integral with the rod adjacent said end and engaging one of the beveled seats of the piston, a beveled plug engaging the other seat of the piston, a split threaded stem carried by the plug for removable engagement with the threaded end of the rod, and means to force the threads of the stem into binding engagement with the threads of the rod to lock the parts against relative movement.

2. In combination, a piston having an opening therethrough and beveled seats at each end of the opening, a rod having a hollow interiorly threaded end within said opening, a beveled collar integral with the rod adjacent said end and engaging one of the beveled seats of the piston, a beveled plug engaging the other seat of the piston, a split threaded stem carried by the plug for removable engagement with the threaded end of the rod, a flared socket in said stem, a spreader positioned within the socket, and a screw extending through the plug into the socket and engaging the spreader to adjust the latter and force the threads of the stem into binding engagement with the threads of the rod to lock the parts against relative movement.

In testimony whereof I affix my signature.

FRANK A. van BEZEL.